(12) United States Patent
Yamazaki et al.

(10) Patent No.: US 9,852,825 B2
(45) Date of Patent: Dec. 26, 2017

(54) CONDUCTIVE COMPOSITION AND SOLID ELECTROLYTIC CAPACITOR OBTAINED USING AFOREMENTIONED COMPOSITION

(71) Applicant: Mitsubishi Chemical Corporation, Tokyo (JP)

(72) Inventors: Akira Yamazaki, Toyohashi (JP); Takahiro Sakai, Toyohashi (JP); Kohei Yamada, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 80 days.

(21) Appl. No.: 14/435,088

(22) PCT Filed: Oct. 8, 2013

(86) PCT No.: PCT/JP2013/077321
§ 371 (c)(1),
(2) Date: Apr. 10, 2015

(87) PCT Pub. No.: WO2014/061502
PCT Pub. Date: Apr. 24, 2014

(65) Prior Publication Data
US 2015/0279502 A1    Oct. 1, 2015

(30) Foreign Application Priority Data

Oct. 16, 2012 (JP) ................................. 2012-229020
Jan. 28, 2013 (JP) ................................. 2013-012812

(51) Int. Cl.
*H01B 1/00* (2006.01)
*C09D 5/24* (2006.01)
(Continued)

(52) U.S. Cl.
CPC ......... *H01B 1/124* (2013.01); *C08G 73/0266* (2013.01); *C08K 5/053* (2013.01);
(Continued)

(58) Field of Classification Search
CPC . H01B 1/00; H01B 1/124–1/128; H01B 1/14; H01B 1/20; C09D 5/24
See application file for complete search history.

(56) References Cited

U.S. PATENT DOCUMENTS 5,567,355 A * 10/1996 Wessling ................. C08F 38/02
252/500
2008/0005878 A1    1/2008 Merker et al.
(Continued)

FOREIGN PATENT DOCUMENTS

CN   101263568 A    9/2008
CN   101320628 A   12/2008
(Continued)

OTHER PUBLICATIONS

Korean Office Action dated Oct. 31, 2016 in Patent Application No. 10-2015-7009197 (with English translation).
(Continued)

*Primary Examiner* — Mark Kopec
(74) *Attorney, Agent, or Firm* — Oblon, McClelland, Maier & Neustadt, L.L.P.

(57) ABSTRACT

Provided are: a conductive composition containing a conductive polymer (A) satisfying the below-mentioned condition (i), and a compound (B) having at least 3 hydroxyl groups, and having a pH at 25° C. of a 1 mol/L aqueous solution of no greater than 9.0; a conductive composition that further contains a water-soluble polymer (C) having a hydroxyl group; and a solid electrolytic capacitor having a solid electrolytic layer containing the composition. Condition (i): the volume-average particle size of the smallest particle distribution containing the smallest peak exhibited by the particle size among at least one peak obtained by measuring the particle distribution by means of a dynamic light scattering method using a conductive polymer solution
(Continued)

containing 1% by mass of the conductive polymer being less than 26 nm.

12 Claims, 2 Drawing Sheets

(51) Int. Cl.
| | | |
|---|---|---|
| *H01B 1/12* | (2006.01) | |
| *C08K 5/053* | (2006.01) | |
| *C08L 101/12* | (2006.01) | |
| *H01G 9/028* | (2006.01) | |
| *C09D 179/02* | (2006.01) | |
| *C08G 73/02* | (2006.01) | |
| *H01G 9/15* | (2006.01) | |

(52) U.S. Cl.
CPC .......... *C08L 101/12* (2013.01); *C09D 179/02* (2013.01); *H01G 9/028* (2013.01); *H01G 9/151* (2013.01)

(56) References Cited

U.S. PATENT DOCUMENTS

| | | | | |
|---|---|---|---|---|
| 2010/0085319 A1* | 4/2010 | Hayashi | .................. | G06F 3/045 345/173 |
| 2011/0019340 A1 | 1/2011 | Nobuta et al. | | |
| 2011/0151153 A1* | 6/2011 | Felder | ..................... | C08L 65/00 428/32.86 |
| 2011/0182002 A1* | 7/2011 | Takahashi | ............... | C08L 65/00 361/524 |
| 2012/0134073 A1* | 5/2012 | Uher | ..................... | H01G 9/028 361/528 |

FOREIGN PATENT DOCUMENTS

| | | |
|---|---|---|
| JP | 7-196791 | 8/1995 |
| JP | 7-324132 | 12/1995 |
| JP | 8-337725 | * 12/1996 |
| JP | 2001-64487 A | 3/2001 |
| JP | 2005-85947 A | 3/2005 |
| JP | 2007-27767 A | 2/2007 |
| JP | 2007-250993 A | 9/2007 |
| JP | 2010-116441 A | 5/2010 |
| KR | 10-2009-0023581 A | 3/2009 |
| WO | 2009/128401 A1 | 10/2009 |

OTHER PUBLICATIONS

International Search Report dated Dec. 24, 2013 in PCT/JP2013/077321 filed Oct. 8, 2013.

Combined Chinese Office Action and Search Report dated Nov. 2, 2016 in Chinese Patent Application No. 201380054218.9 (with unedited computer generated English translation and English translation of Category of Cited Documents).

* cited by examiner

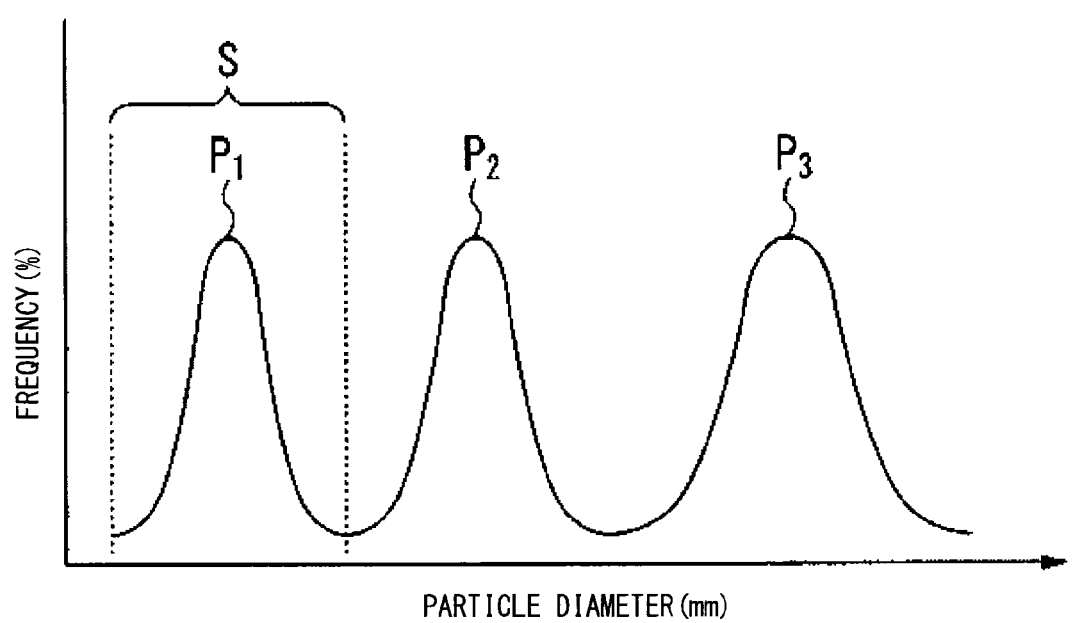

CONDUCTIVE COMPOSITION AND SOLID ELECTROLYTIC CAPACITOR OBTAINED USING AFOREMENTIONED COMPOSITION

TECHNICAL FIELD

The present invention relates to a conductive composition and a solid electrolytic capacitor obtained using the same.

This application is based on and claims priorities from Japanese Patent Application No. 2012-229020, filed on Oct. 16, 2012 and Japanese Patent Application No. 2013-12812, filed on Jan. 28, 2013, the disclosures of which are incorporated herein in their entireties by references.

BACKGROUND ART

Recently, a solid electrolytic capacitor manufactured by forming a solid electrolytic layer with a conductive polymer on a dielectric oxidation film formed on the surface of an anode body is being developed. For example, a solid electrolytic capacitor is being developed, in which a solid electrolytic layer that is formed using a conductive polymer as a solid electrolyte and a cathode body are sequentially formed on a dielectric oxidation film formed on the surface of an anode body (film-forming metals) that is composed of the porous metal bodies having a valve action, such as, aluminum, niobium, tantalum, titanium, or magnesium.

As compared with the conventional solid electrolytic capacitor that is formed using manganese dioxide as a solid electrolytic layer, the solid electrolytic capacitor that is formed using a conductive polymer as a solid electrolytic layer exhibits 10 to 100 times higher conductivity of the solid electrolyte, and also, can greatly decrease an ESR (Equivalent Series Resistance).

For this reason, it is expected that the solid electrolytic capacitor is applied for a variety of uses, such as, the absorption of high frequency noise.

A method for forming the solid electrolytic layer on the dielectric oxidation film is roughly classified into a chemical oxidative polymerization method and an electrolytic polymerization method.

In addition, pyrrole, thiophene, 3,4-ethylenedioxythiophene, or aniline is known as a monomer that constitutes a conductive polymer material.

However, for the chemical oxidative polymerization method and the electrolytic polymerization method, since a polymerization reaction is performed on a dielectric oxidation film, it might be easy to mix impurities in a solid electrolytic layer, and a short circuit might be caused.

In addition, it might be easy to complicate a manufacturing process.

As a countermeasure, a polymer suspension coating method is known as a method for forming a solid electrolytic layer on a dielectric oxidation film without performing a chemical oxidative polymerization or an electrolytic polymerization.

For example, a method including applying a dispersion including a conductive polymer on a dielectric oxidation film and then drying the dispersion is known as a method for forming a solid electrolytic layer of a conductive polymer on a dielectric oxidation film.

The dielectric oxidation film is formed on the surface of an anode body of porous metal, and thus, has a fine concave-convex shape.

For this reason, for the method for applying the dispersion including a conductive polymer on a dielectric oxidation film, it is difficult to impregnate the dispersion including a conductive polymer to the inside of the dielectric oxidation film.

As a result, it is difficult to form a solid electrolytic layer in the inside (fine pore) of the fine concave-convex shape of the dielectric oxidation film, and thus, the solid electrolytic layer is only formed on the surface layer. Therefore, there was a problem in that a capacity incidence of the solid electrolytic capacitor that can be obtained becomes low.

In addition, lately, a solid electrolytic capacitor requires reliability in all circumstances as well as high capacity as described above, and especially, humidity stability (moisture resistance) is considered as the most important thing.

Especially, it is required to inhibit the increase of an ESR (Equivalent Series Resistance) for a humidity resistance test under the hard atmosphere of 65° C. and 95% R.H.

Accordingly, a method for obtaining a conductive composition with a low moisture absorption by including a specific compound in a conductive composition including a conductive polymer has been proposed (Patent Document 1).

In addition, a method for obtaining a conductive composition with a low heat deterioration due to heating by including an alkali compound in a conductive composition has been proposed (Patent Document 2).

CITATION LIST

Patent Document

Patent Document 1: WO 2009/128401 A
Patent Document 2: JP 2010-116441 A

DISCLOSURE OF THE INVENTION

Problem to be Solved by the Invention

However, recently, in accordance with the miniaturization, weight lightening, and high capacity of a solid electrolytic capacitor, the porous film formation metals become fine, and thus, have fine pores in many different shapes. In the method disclosed in Patent Document 1, there is a problem in that it is difficult to impregnate a conductive polymer in the inside of the dielectric oxidation film having such a fine pore.

In addition, the solid electrolytic capacitor requires reliability in all circumstances, and especially, humidity stability (moisture resistance) is considered as the most important thing. There are problems in that the conductive composition that can be obtained by the method disclosed in Patent Document 2 has low moisture resistance and it is difficult to inhibit the decrease of an ESR (Equivalent Series Resistance).

The present invention has been made in consideration of the above reasons, and an object of the present invention is to provide a conductive composition for a capacitor, in which a conductive polymer is sufficiently impregnated in the inside of a fine concave-convex shape of an dielectric oxidation film, and also, a solid electrolytic capacitor having high moisture resistance and high reliability can be simply manufactured, and a solid electrolytic capacitor that can be obtained using the composition.

Means for Solving Problem

As the results of hardly reviewing the above objects, the present inventors found that the impregnating ability into the inside of fine pores in a dielectric oxidation film is improved by defining an average particle diameter of a conductive polymer included in a conductive composition, and moisture resistance is improved by including a specific compound in the conductive composition, and thus, completed the invention.

In other words, a first embodiment of the invention relates to a conductive composition including (A) a conductive polymer that satisfies the following condition (i) and (B) a water-soluble compound having three or more hydroxyl groups, in which the pH of 1 mol/L aqueous solution thereof also is 9.0 or less.

Condition (i): when a particle distribution to a conductive polymer solution including 1% by mass of the conductive polymer with respect to the total mass of the solution is measured by a dynamic light scattering method, and then, a minimum particle distribution including the peak exhibiting a minimum particle diameter among one or more peaks that can be obtained by the above measurement is obtained, a volume average particle diameter of the particle diameter included in the minimum particle distribution is less than 26 nm.

Here, the volume average particle diameter is defined by the measuring method to be described below.

(2) The second embodiment of the invention relates to the conductive composition of the above (1), in which a volume average particle diameter of the conductive polymer (A) for the condition (i) may be less than 10 nm.

(3) The third embodiment of the invention relates to the conductive composition of the above (1) or (2), in which, 20 to 100 mol % among the repeated units that constitutes the conductive polymer (A) may have an acidic group.

(4) The fourth embodiment of the invention relates to the conductive composition of any one of the above (1) to (3), in which the acidic group of the conductive polymer (A) may be a sulfonic acid group or a carboxylic acid group.

(5) The fifth embodiment of the invention relates to the conductive composition of any one of the above (1) to (3), in which the conductive polymer (A) may have a repeating unit represented by the following General Formula (1).

[Chemical Formula 1]

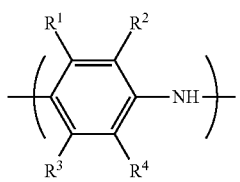

(1)

(in Formula (1), $R^1$ to $R^4$ each independently represent —H, a linear or branched alkyl group of 1 to 24 carbon atoms, a linear or branched alkoxy group having 1 to 24 carbon atoms, an acidic group or a salt thereof, a hydroxyl group, a nitro group, —F, —Cl, —Br, or —I, and among $R^1$ to $R^4$, at least one represents an acidic group or a salt thereof. Here, the acidic group is a sulfonic acid or a carboxyl group.)

(6) The sixth embodiment of the invention relates to the conductive composition of any one of the above (1) to (5), in which the pH of 1 mol/L aqueous solution of the water-soluble compound (B) may be 7 or less.

(7) The seventh embodiment of the invention relates to the conductive composition of any one of the above (1) to (6), in which the water-soluble compound (B) may be a water-soluble low molecular weight compound or a water-soluble high molecular weight compound, and the water-soluble low molecular weight compound may be at least one compound selected from glycerin, trimethylolethane, pentaerythritol, and mannitol and the water-soluble high molecular weight compound may be at least one selected from polyvinyl alcohol, methylcellulose, and pullulan.

(8) The eighth embodiment of the invention relates to a solid electrolytic capacitor having a solid electrolyte including the conductive composition disclosed in any one of the above (1) to (7).

(9) The ninth embodiment of the invention relates to a conductive composition including a conductive polymer (A) that satisfies the following condition (i) and a water-soluble polymer (C) including a repeating unit having an acetal group as a constituent unit.

Condition (i): when a particle distribution to a conductive polymer solution including 1% by mass of the conductive polymer with respect to the total mass of the solution is measured by a dynamic light scattering method, and then, a minimum particle distribution including the peak exhibiting a minimum particle diameter among one or more peaks that can be obtained by the above measurement is obtained, a volume average particle diameter of the particle diameter included in the minimum particle distribution is less than 26 nm.

(10) The tenth embodiment of the invention relates to the conductive composition of the above (9), in which the volume average particle diameter of the conductive polymer (A) for the condition (i) may be less than 10 nm.

(11) The 11$^{th}$ embodiment of the invention relates to the conductive composition of the above (9) or (10), in which 20 to 100 mol % among the repeating units that constitute the conductive polymer (A) may have an acidic group.

(12) The 12$^{th}$ embodiment of the invention relates to the conductive composition of any one of the above (9) to (11), in which the acidic group may be a sulfonic acid group or a carboxylic acid group.

(13) The 13$^{th}$ embodiment of the invention relates to the conductive composition of any one of the above (9) to (12), in which the conductive polymer (A) may have a repeating unit represented by the following General Formula (1).

[Chemical Formula 2]

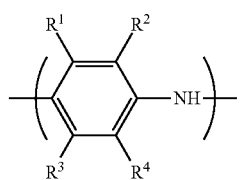

(1)

(14) The 14$^{th}$ embodiment of the invention relates to the conductive composition of any one of the above (9) to (13), in which the water-soluble polymer (C) having an acetal group may be a polyvinyl alcohol derivative.

(15) The 15$^{th}$ embodiment of the invention relates to the conductive composition of any one of the above (9) to (14), in which the water-soluble polymer (C) having an acetal group may have a degree of acetalization of 5 to 50 mol %.

(16) The 16$^{th}$ embodiment of the invention relates to a solid electrolytic capacitor including a solid electrolyte including the conductive composition of any one of the above (9) to (14).

(17) The 17th embodiment of the invention relates to a solid electrolytic capacitor having an anode body formed with metals as a constituent material, a dielectric thin film formed on the surface of the anode body, and a solid electrolytic layer formed on the dielectric thin film, in which the solid electrolytic layer may include a first conductive polymer layer formed from the conductive composition of any one of the above (1) to (7) and (9) to (15), and a second conductive polymer layer formed on the first conductive polymer layer.

In addition, according to another aspect of the invention, the invention has the following shape.

Any embodiment of the invention relates to a conductive composition including (A) a conductive polymer that satisfies the following condition (i), and the compound (B) having three or more hydroxyl groups, in which the pH of 1 mol/L aqueous solution thereof also is 9.0 or less. Condition (i): when a particle distribution to a conductive polymer solution including 1% by mass of the conductive polymer with respect to the total mass of the solution is measured by a dynamic light scattering method, and then, a minimum particle distribution including the peak exhibiting a minimum particle diameter among one or more peaks that can be obtained by the above measurement is obtained, a volume average particle diameter of the particle diameter included in the minimum particle distribution is less than 26 nm.

Any embodiment of the invention relates to a conductive composition including a conductive polymer (A) having less than 10 nm of a volume average particle diameter of the above condition (i).

Any embodiment of the invention relates to a conductive composition including a conductive polymer (A) that satisfies the following condition (i), and a water-soluble polymer (C) having an acetal group.

Condition (i): when a particle distribution to a conductive polymer solution including 1% by mass of the conductive polymer with respect to the total mass of the solution is measured by a dynamic light scattering method, and then, a minimum particle distribution including the peak exhibiting a minimum particle diameter among one or more peaks that can be obtained by the above measurement is obtained, a volume average particle diameter of the particle diameter included in the minimum particle distribution is less than 26 nm.

Any embodiment of the invention relates to a conductive composition including a conductive polymer (A) having 10 nm or less of a volume average particle diameter of the above condition (i) base.

Any embodiment of the invention relates to a conductive composition, in which the acidic group is a sulfonic acid group and/or a carboxylic acid group.

Any embodiment of the invention relates to a solid electrolytic capacitor including having an anode body formed with metals as a constituent material, a dielectric thin film formed on the surface of the anode body, and a solid electrolytic layer formed on the dielectric thin film, in which the solid electrolytic layer may include a first conductive polymer layer formed from the conductive composition and a second conductive polymer layer formed on the first conductive polymer layer.

Any embodiment of the invention relates to the conductive composition, which further includes a water-soluble polymer (C) having a hydroxyl group.

Effect of the Invention

According to the embodiments related to the above aspects of the invention, a conductive composition for a capacitor, in which a conductive polymer is sufficiently impregnated in the inside of a fine concave-convex shape of an dielectric oxidation film, and also, a solid electrolytic capacitor having high moisture resistance and high reliability can be simply manufactured, and a solid electrolytic capacitor having a solid electrolyte that can be obtained by applying the composition and then drying the composition can be obtained.

BRIEF DESCRIPTION OF DRAWINGS

FIG. 3 is a mimetic diagram illustrating a particle distribution measured by a dynamic light scattering method of a conductive polymer related to an embodiment of the invention.

MODE(S) FOR CARRYING OUT THE INVENTION

Hereinafter, the invention will be described in detail with reference to embodiments.

In addition, for the embodiments of the invention, "a conductive polymer" refers to a conductive polymer, or the components of the polymer for a conductive polymer that is doped (adding dopant) to the components of the polymer.

In addition, "a conductive polymer solution" refers to the solution that is dissolved or dispersed with the components of the polymer for the conductive polymer that is doped to the polymer component.

In addition, for the embodiment of the invention, "an impregnation" refers to a dipping (penetration) of a conductive polymer into the inside of fine concave-convex shapes of a dielectric oxidation film. "An impregnating ability" refers to the ability of dipping (penetrating) a conductive polymer in the inside of fine concave-convex shapes of the dielectric oxidation film.

The impregnating ability may be relatively evaluated by observing the cross-section of a capacitor with a scanning electron microscope, and the like, for example.

In addition, for the embodiments of the invention, "a (volume) average particle diameter" refers to a value calculated by a dynamic light scattering method to be described below, and also called "a hydrodynamic diameter".

Figure 1:
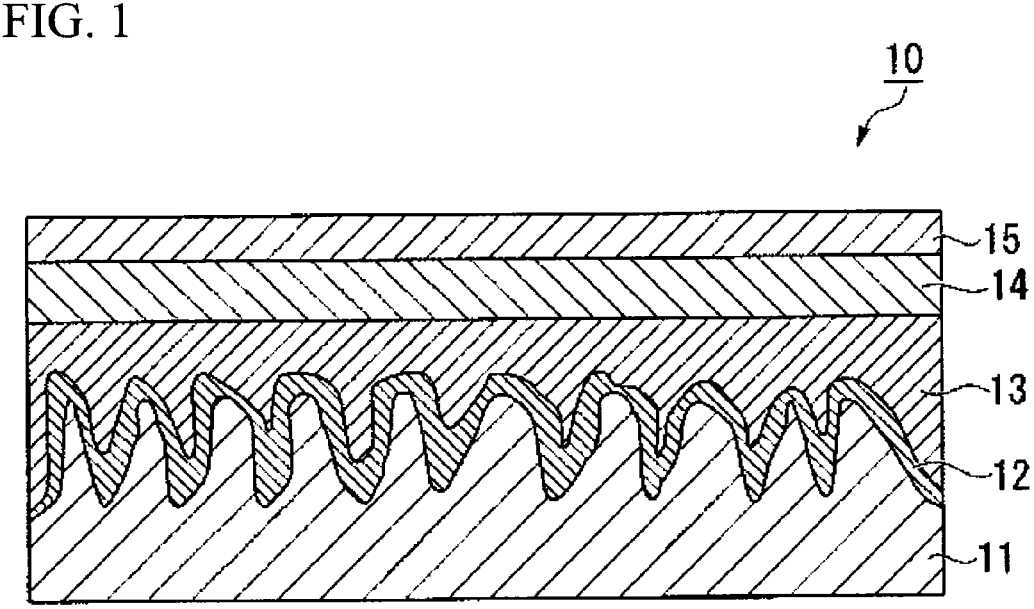
FIG. 1 is a cross-sectional mimetic diagram illustrating an example of a solid electrolytic capacitor related to an embodiment of the invention.

A solid electrolytic capacitor 10 of the present embodiment includes a solid electrolytic layer 13 on a dielectric oxidation film 12 as illustrated in FIG. 1. The solid electrolytic layer 13 is formed by applying a conductive composition solution for a capacitor, which includes a conductive polymer (A) and a compound (B) on the dielectric oxidation film 12, and then drying. The conductive composition solution for a capacitor includes a water-soluble polymer (C) and a solvent (D) in some cases. According to the solid electrolytic layer 13 thus formed, a conductive polymer may be impregnated into the inside of fine concave-convex shapes of the dielectric oxidation film 12, thereby improving capacity incidence of the solid electrolytic capacitor 10.

<Conductive Polymer (A)>

A volume average particle diameter of a conductive polymer (A) used for the conductive composition related to the embodiment of the invention is less than 26 nm.

Here, since the volume average particle diameter of the polymer (A) is less than 26 nm, the conductive polymer may be sufficiently impregnated into the inside of fine concave-convex shapes of the dielectric oxidation film 12 for the solid electrolytic capacitor 10 as illustrated in FIG. 1, and thus, it is possible to obtain the solid electrolytic capacitor 10 having high capacity incidence. In addition, as fine concave-convex shapes that are shown in the dielectric oxidation film 12 as illustrated in FIG. 1, there are capacitors having various structure or different heights depending on the capacitor makers, and thus, a proper shape is preferably selected by a suitable experiment so as to have good dielectric constant or impregnating ability of a capacitor.

The volume average particle diameter of a conductive polymer may be 20 nm or less. By being the volume average particle diameter of the conductive polymer within the range, it is possible to sufficiently impregnate the conductive polymer into the inside of fine concave-convex shapes of the dielectric oxidation film 12. The volume average particle diameter of the conductive polymer may be 10 nm or less. By being the volume average particle diameter of the conductive polymer within the range, it is possible to obtain the impregnating ability thereof even for more fine concave-convex shapes. By being the particle diameter of the conductive polymer to be small, there are advantages in that a dipping ability to fine pores is improved, and a coating rate of fine concave-convex shape is improved, thereby leading the improvement of the electric capacity of a capacitor. It is more preferable to be 5 nm or less of the volume average particle diameter of the conductive polymer. By being the volume average particle diameter of the conductive polymer within the range, it is possible to obtain the impregnating ability to more fine concave-convex shapes, thereby more improving electric capacity of a capacitor.

In addition, the volume average particle diameter of the conductive polymer may be 0.001 nm or more. By being the volume average particle diameter of the conductive polymer within the range, the conductive polymer may be impregnated into the inside of the fine concave-convex shapes of the dielectric oxidation film 12, thereby exhibiting better film-forming ability by the conductive polymer on the dielectric oxidation film 12 and conductivity for the solid electrolytic capacitor 10. The volume average particle diameter of the conductive polymer may be preferably 0.01 nm or more, and more preferably 0.1 nm. By satisfying such a value of the volume average particle diameter, there are advantages in that it is possible for the conductive polymer to be dipped into the small holes, and thus, the impregnating ability of the dielectric of the capacitor is improved for the concave-convex structure and the above-described film-forming ability and conductivity are further improved.

Due to the above reasons, the volume average particle diameter of the conductive polymer needs to be 0.001 to 26 nm, and may be preferably 0.001 to 20 nm, more preferably 0.01 to 10 nm, and still more preferably 0.1 to 5 nm.

In the present embodiment, the volume average particle diameter of the conductive polymer (A) is a value to be measured below.

First, with a conductive polymer, a conductive polymer solution in a concentration of 1% by mass is prepared in water, and a particle distribution for the solution is measured by a dynamic light scattering method using a dynamic light scattering particle diameter-measuring device. A viscosity of the polymer solution that affects the measuring value of dynamic light scattering method is calibrated using the viscosity of pure water as a baseline.

Among one or more peaks obtained by such a measurement, a minimum particle distribution including the peak having a minimum particle diameter is selected. The volume average particle diameter to each of the particles included in the minimum particle distribution is obtained, and then, defined as a volume average particle diameter of the conductive polymer.

In addition, in the present embodiment, "a minimum particle distribution" is the distribution that is a smallest particle distribution among one or more particles distribution groups obtained by interpreting the result obtained after measuring the particle distribution by a dynamic light scattering method, and then, calibrating the particle distribution with the viscosity of pure water.

In detail, a minimum particle distribution is a particle distribution including a peak P1 that has a minimum particle diameter among one or more peaks, P1, P2, P3, . . . that are obtained by measuring particle distributions as illustrated in FIG. 3. When the peak obtained by measuring the particle distribution with a dynamic light scattering method is one, such a particle distribution is a minimum particle distribution. In addition, when a plurality of particle distributions is overlapped, the particle distributions are subjected to a wave-form separation according to a general interpreting method using a Gauss function or a Lorentz function that is added in wide use software, and the like. As an analyzing result, for example, a certain area, such as, Mark S of FIG. 3, is separated as a minimum particle distribution.

A conductive polymer may be soluble in water or an organic solvent.

Here, in the present embodiment, "the soluble property" of a conductive polymer means that 0.1 g or more of the conductive polymer is uniformly dissolved in 10 g of water or an organic solvent (a liquid temperature of 25° C.).

When the conductive polymer is soluble in water or an organic solvent, at the time of manufacturing a solid electrolytic capacitor 10, the conductive polymer may be dissolved in water or an organic solvent to prepare a conductive polymer solution. Since then, using a simple and easy method of applying and drying the conductive polymer solution on the dielectric oxidation film 12, a solid electrolytic layer 13 may be formed, in which the conductive polymer may be sufficiently impregnated into the inside of the fine concave-convex shapes of the dielectric oxidation film 12.

A conductive polymer that is soluble in water or an organic solvent is not particularly limited as long as it can be dissolved in water or an organic solvent, and examples thereof may include one having a sulfonic acid group (—SO$_3$H) (also referred to as a sulfo group) or a carboxylic acid group (—COOH) (also referred to as a carboxyl group), or one having both of them. When using them, it becomes good in consideration of solubility.

For a soluble conductive polymer, each of a sulfonic acid group and a carboxyl group may be included in a state of acid (—SO$_3$H, —COOH), or may be included in a state of ion (—SO$_3$—, —COO—).

Such a conductive polymer may be a compound having a repeating unit represented by the following General Formula (1).

[Chemical Formula 3]

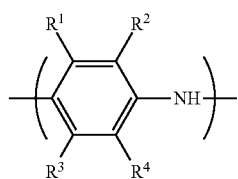

(1)

(in Formula (1), $R^1$ to $R^4$ each independently represent —H, a linear or branched alkyl group of 1 to 24 carbon atoms, a linear or branched alkoxy group having 1 to 24 carbon atoms, an acidic group or a salt thereof, a hydroxyl group, a nitro group, —F, —Cl, —Br, or —I, and among $R^1$ to $R^4$, at least one represents an acidic group or a salt thereof. Here, the acidic group is a sulfonic acid or a carboxyl group.)

Here, "the acidic group" is a sulfonic acid group or a carboxyl group. As such a compound, among $R^1$ to $R^4$, any one may be a linear or branched alkoxy group having 1 to 4 carbon atoms, the other may be —$SO_3$— or —$SO_3H$, and the rest may be H. The compound has an advantage in that the compound may be easily prepared.

In addition, "a salt of an acidic group" refers to at least one type among an alkali metal salt, ammonium salt, and substituted ammonium salt of the acidic group.

A conductive polymer may include 20 to 100 mol % of the repeating unit represented by the above General Formula (1) among the whole repeating units (with respect to 100 mol % of the total repeating units) that constitute the conductive polymer. The conductive polymer exhibits excellent solubility in water and an organic solvent by including the repeating units within the above range. The conductive polymer may include 50 to 100 mol % of the repeating unit, and within the above range, the solubility thereof is more excellent. The conductive polymer may more preferably include 100 mol % of the repeating unit, substantially, and regardless of pH, the solubility thereof in water and an organic solvent is more excellent.

In addition, the conductive polymer may include 10 or more repeating units represented by the above General Formula (1) in one molecule. The conductivity of the conductive polymer is excellent by including the repeating units.

A compound having the repeating unit represented by the above General Formula (1) may be poly(2-sulfo-5-methoxy-1,4-iminophenylene. The compound has excellent solubility.

A conductive polymer may have a mass average molecular weight of 3000 to 1000000. When the mass average molecular weight of the conductive polymer is 3000 or more, the film-forming ability and film strength thereof are excellent. When the mass average molecular weight of the conductive polymer is 1000000 or less, the solubility thereof in water and an organic solvent is more excellent. The conductive polymer may also have more preferably a mass average molecular weight of 3000 to 300000, and thus, within this range, the solubility in water and an organic solvent is more excellent. Therefore, the conductive polymer may have particularly preferably a mass average molecular weight of 3000 to 100000, and thus, within this range, the solubility in water and an organic solvent is particularly excellent.

Here, for example, the mass average molecular weight of the conductive polymer is a value obtained by measuring a molecular weight by a gel permeation chromatography (GPC) (a gel permeation or gel filtration chromatography), and then, performing the sodium polystyrene sulfonic acid conversion thereof.

The conductive polymer of the present embodiment may be obtained by various synthesizing methods, such as, a chemical polymerization or electrolytic polymerization.

In addition, the conductive polymer of the present embodiment may be also prepared by the synthesizing method disclosed in JP 1995-196791 A and JP 1995-324132 A.

The content of the conductive polymer may be 9% by mass or less in 100% by mass of the conductive polymer solution (or a conductive composition solution).

When the content of the conductive polymer is 9% by mass or less in 100% by mass of the conductive polymer solution, the wettability to a film-forming metal 11 formed with a dielectric oxidation film 12 or a separator 23 included in a winding-type solid electrolytic capacitor device 20 to be described is improved, and thus, the conductive polymer may be sufficiently impregnated into the inside of fine concave-convex shapes without depositing on the surface of a dielectric oxidation film 12.

The lower limit of the content of the conductive polymer in the conductive polymer solution is not particularly limited, but may be 0.1% by mass or more. When the content is 0.1% by mass or more, the solid electrolytic layer 13 having a desired thickness may be easily formed.

The content of the conductive polymer in 100% by mass of the conductive polymer solution may be 5% by mass or less, and within this range, the conductive polymer may be sufficiently impregnated into the inside of more fine concave-convex shapes.

For this reasons, the content of the conductive polymer in 100% by mass of the conductive polymer solution may be preferably 0.1 to 9% by mass, and more preferably 0.1 to 5% by mass.

<Additives of Conductive Polymer (A)>

In addition to a conductive polymer (A), a conductive composition used for forming a solid electrolytic layer 13 may include a conductive polymer (other conductive polymers) other than the conductive polymer (A), or other materials, such as, additives, for example, surfactant, and the like.

Other conductive polymers as described above may be poly(3,4-ethylenedioxythiophene), polypyrrole, polyaniline, and the like.

When other conductive polymers are used, dopants (for example, polystyrene sulfonic acid, and the like) may be used in combination thereof.

A surfactant that is included in the conductive composition may be an anionic surfactant, a cationic surfactant, an amphoteric surfactant, a nonionic surfactant, a fluorine surfactant, and the like.

These surfactants may be used singly or in combination of two or more types thereof.

When the conductive composition includes a surfactant, the content of the surfactant in the whole mass of the conductive composition may be 0.1 to 20% by mass. When the content of the surfactant is 0.1% by mass or more, the surface tension of the conductive composition may be decreased. When the surface tension of the conductive composition is decreased by adding 0.1% by mass or more of the surfactant, the conductive composition is easily entered into the inside of concave-convex structure of the dielectric oxidation film of the capacitor. As a result, conductivity is increased by forming a conductive path, in which many conductive compositions are entered in the inside of concave-convex structure, and thus, dense electricity flows. Meanwhile, in the case where the mass of surfactant is 0.1% by mass or less, and thus, a surface tension is high, the conductive composition is not properly entered in the inside of concave-convex structure, and thereby, a rough conductive path is formed, resistance parts are increased, and thus, conductivity does not become good. Similarly, when the amount of surfactant added is too many, and for example, exceeds 20% by mass, the content of surfactant in the conductive composition is increased, and the surfactant is squeezed in the conductive path made between the conductive polymers, thereby deteriorating conductivity (it is difficult to maintain good conductivity).

Therefore, the impregnating ability into the inside of fine concave-convex shapes of the dielectric oxidation film 12 is improved, and the conductivity of the solid electrolytic layer 13 is increased. Meanwhile, the content of surfactant is 20% by mass or less, it is possible to maintain good conductivity. The content of surfactant is preferably 0.1 to 5% by mass, because the conductivity of a solid electrolytic layer 13 is high, and excellent conductivity of the solid electrolytic layer 13 may be maintained at the same time.

<Compound (B)>

As the compound (B) of the present embodiment, the compound having three or more hydroxyl groups, in which pH of 1 mol/L aqueous solution thereof is also 9.0 or less, is used. The compound (B) is mainly included to improve an action on improving moisture resistance.

In addition, in the present specification, pH is defined as a value at 25° C. unless otherwise specifically stated. In other words, even if the pH is the value other than the range defined in the present specification, when the pH is the pH value in the range that is calibrated with the pH value at 25° C. and defined in the basic specification, the pH values are included in the range of the invention.

Examples of the compound (B) may include a compound having three hydroxyl groups; a compound having four hydroxyl groups, such as, glycerin, 1,2,4-butanetriol, 2-(hydroxymethyl)-1,3-propanediol, trimethylolethane, 2-deoxy-D-ribose, tris(hydroxymethyl)aminomethane, and triethanolamine; a compound having five hydroxyl groups, such as, erythritol, threitol, pentaerythritol, arabinose, fucose, lyxose, rhamnose, ribose, and xylose; a compound having six hydroxyl groups, such as, xylitol, ribitol, arabinitol, allose, fructose, galactose, glucose, gulose, mannose, psicose, sorbose, tagatose, and talose; mannitol, galactitol, allitol, iditol, inositol, talitol, dipentaerythritol, and the like.

Especially, the compound (B) may be a compound having three or more hydroxyl groups, in which the pH of 1 mol/L aqueous solution of the compound (B) at 25° C. is also 9.0 or less. By selecting the compound (B) to have the above-described conditions, the moisture resistance of a conductive composition becomes good. Under the above-described conditions, the compound (B) may be a compound having the pH of 8.0 or less, and more preferably, a compound having the pH of 7.0 or less. By being the pH of the compound (B) to be in the above-described range and being the compound (B) to having the above-described conditions, the moisture resistance of a conductive composition further becomes good.

The lower limit of the pH is preferably 1 or more in terms of the stability of a conductive composition, but the invention is not limited thereto.

Examples of the above-described compound (hereinafter, referred to as a compound (B-1)) may include a compound having three hydroxyl groups; a compound having four hydroxyl group, such as, glycerin, 1,2,4-butanetriol, 2-(hydroxymethyl)-1,3-propanediol, trimethylolethane, and 2-deoxy-D-ribose; a compound having five three hydroxyl groups, such as, erythritol, threitol, pentaerythritol, arabinose, fucose, lyxose, rhamnose, ribose, and xylose; a compound having six hydroxyl groups, such as, xylitol, ribitol, arabinitol, allose, fructose, galactose, glucose, gulose, mannose, psicose, sorbose, tagatose, and talose; mannitol, galactitol, allitol, iditol, inositol, talitol, dipentaerythritol, and the like. Especially, when glycerin, trimethylolethane, pentaerythritol, or mannitol, which is a water-soluble low molecular weight compound (that is not high molecular weight compounds, and especially, has the molecular weight of 500 or less), is used, there is an advantages in that it exhibits high water solubility, and thereby, it is easy to mix with a water-soluble conductive polymer. When polyvinyl alcohol, methylcellulose, or pullulan, which is a water-soluble high molecular weight compound, is used, there is an advantage in that it is easy to mix with a water-soluble conductive polymer.

The compound (B-1) having the pH of 9.0 or less is used. When the compound (B-1) has the pH of 9.0 or less, it does not form an ionic bond along with a side change of a conductive polymer, and the like, and it may have more stable structure to moisture.

As the compound (B-1), the above-described compounds may be used singly or in combination of two or more types thereof.

In addition, the content of the compound (B) in 100% by mass of the conductive composition may be 0.1 to 20% by mass. When the content of the compound (B) is 0.1% by mass or more, moisture resistance may be improved. Meanwhile, the content of the compound (B) in 100% by mass of the conductive composition is 20% by mass or less, the conductivity of the conductive composition may be maintained to be good. The content may be more preferably 0.1 to 5% by mass. By being the content within the above-described range, the conductivity of the conductive composition becomes better.

It is considered that as a principle of action on improving the moisture resistance of a solid electrolytic capacitor, the side chain of a conductive polymer (A) and the hydroxyl groups of the compound (B) having three or more hydroxyl groups form stable network; the compounds (B) form close films by binding themselves by a hydrogen bond, and the like; and/or the effect of moisture on the conductive polymer (A) is inhibited, thereby improving the moisture resistance of the solid electrolytic capacitor. In addition, it is considered that when the pH is 9.0 or more, the side chain of the conductive polymer (A) and the compound (B) form the bond that is soluble in water, and thus, the effect of moisture on the conductive polymer (A) may be inhibited.

<Water-Soluble Polymer (C)>

The conductive composition of the present embodiment includes a water-soluble polymer (C) having a hydroxyl group, in addition to the conductive polymer (A) and the compound (B). The hydroxyl group of the water-soluble polymer (C) and the side chain of the conductive polymer form a stable network, and thus, the water-soluble polymer (C) is included so as to improve moisture resistance and the homogeneity of a conductive composition layer. In detail, the film prepared only with a conductive polymer has a structure exhibiting water solubility, and thus, does not have moisture resistance, and it is possible to change the film due to moisture. For this reason, it is considered that by adding a compound having a hydroxyl group to a conductive polymer, the conductive polymers are connected to each other (forms a stable network or a hydrogen bond), thereby forming a close film, improving resistance to water, and exhibiting moisture resistance.

As the water-soluble polymer (C), one having an acetal group may be used. By using the water-soluble polymer (C) having an acetal group, there are advantages in that the interaction with the conductive polymer is strong, and water resistance and moisture resistance are improved. The acetalization degree of the water-soluble polymer (C) may be 5 to 50 mol %. By being the degree of acetalization within the above-described range, there is an advantage in that water solubility is high and strong interaction with the conductive polymer is exhibited, thereby making water resistance and moisture resistance to be good.

Examples of the water-soluble polymer (C) may include, but is not limited to, cellulose, cellulose derivatives, starch, starch derivatives, dextrin, dextran, polysaccharides, pullulan, polyvinyl alcohol, or the like.

As the water-soluble polymer (C), cellulose derivatives, pullulan, or polyvinyl alcohol may be used. By using them as the water-soluble polymer (C), the homogeneity of the water-soluble polymer (C) becomes good.

The mass average molecular weight of the water-soluble polymer (C) may be 5000 to 10000000. By being the mass average molecular weight within the above-described range, the homogeneity of the water-soluble polymer (C) becomes good.

The mass average molecular weight of the water-soluble polymer (C) may be 10000 to 5000000, and more preferably, 15000 to 3000000. By being the mass average molecular weight within the above-described range, the homogeneity of the water-soluble polymer (C) becomes better.

The above-described various compounds and the compounds having various molecular weights as described above may be used singly, or in combination of two or more types thereof as the compound including the water-soluble polymer (C).

In addition, as the content of the water-soluble polymer (C) in the conductive composition, the mass of other components of the conductive composition:the mass of the water-soluble polymer (C) of the conductive composition may be 100:0.1 to 400. By being the content of the water-soluble polymer (C) within the above-described range, the homogeneity of the water-soluble polymer (C) becomes better. The content of the water-soluble polymer (C) may be more preferably 1 to 50% by mass. By being the content of the water-soluble polymer (C) within the above-described range, the homogeneity of the water-soluble polymer (C) becomes better.

When the water-soluble polymer (C) is used, the conductive polymer (A), and the hydroxyl groups of the compound (B) and the water-soluble polymer (C) form a stable and strong network, and thus, the moisture resistance and homogeneity of a solid electrolytic layer 13 (the layer formed with a conductive composition, a conductive composition layer) become good. Here, "the homogeneity" means that the material distribution of the solid electrolytic layer 13 is almost consistent, and the good homogeneity state means the state, in which in detail, there are no biased thicknesses of the solid electrolytic layer 13, and also there are no disruptions and fractures.

<Solvent (D)>

The solvent (D) may be water, an organic solvent, or a mixed solvent thereof (water-containing organic solvent), but the invention is not limited thereto. These solvents make solubility and dispersbility to be good when the conductive polymer (A) and the compound (B) (the water-soluble polymer (C)) are dissolved therein.

The organic solvent may by alcohols, such as, methanol, ethanol, isopropyl alcohol, propyl alcohol, and butanol; ketones, such as, acetone, methyl ethyl ketone, methyl isobutyl ketone, and methyl isobutyl ketone; ethylene glycols, such as, ethylene glycol, ethylene glycol methyl ether, and ethylene glycol mono-n-propyl ether; propylene glycols, such as, propylene glycol, propylene glycol methyl ether, propylene glycol ethyl ether, propylene glycol butyl ether, and propylene glycol propyl ether; amides, such as, dimethylformamide and dimethylacetamide; pyrrolidones, such as, N-methylpyrrolidone and N-ethylpyrrolidone; hydroxyesters, such as, methyl lactate, ethyl lactate, β-methoxyisobutyric acid methyl ester, and α-hydroxyisobutyric acid methyl ester; γ-butyrolactone, and the like. These organic solvents may be used singly, or in combination of two or more types thereof. Among them, in terms of solubility to water and handling, alcohols may be used, and methanol or isopropyl alcohols may be more preferably used.

When the mixed solvent is used as the solvent (D), the content of the organic solvent in 100% by mass of the mixed solvent may be 1 to 70% by mass, and when the content of the organic solvent is within the above-described range, a conductive composition is favorably dissolved in the solvent. The content of the organic solvent in 100% by mass of the mixed solvent may be 3 to 30% by mass. By the above-described content ratio, the conductive polymer is more favorably dissolved in the solvent.

<Alkaline Compound (E)>

As an embodiment of the invention, the conductive composition of the present embodiment may include an alkaline compound (E). By including the alkaline compound (E), the thermal resistance of a conductive composition layer may be improved.

The alkaline compound (E) may be the compounds (E-1) to (E-4) to be described below, but the invention is not limited thereto. When the compounds (E-1) to (E-4) are used as the alkaline compound (E), the thermal resistance of a solid electrolytic layer 13 (a conductive composition layer) is improved.

<Alkaline Metal Hydroxide and/or Alkaline Earth Metal Hydroxide (E-1)>

As an embodiment of the invention, the conductive composition of the present embodiment may include alkaline metal hydroxide or alkaline earth metal hydroxide (E-1). By using the conductive composition including the conductive polymer (A) and alkaline metal hydroxide and/or alkaline earth metal hydroxide (E-1), after performing a heating treatment for forming a conductive composition, the conductivity degradation is inhibited. It is considered because alkaline metal ion or alkaline earth metal ion inhibits the pyrolysis of the side chain of the conductive polymer (A) by heating.

In this case, the conductive polymer (A) purified by coming in contact with a cation-exchange resin may be used as the conductive polymer (A). By using the conductive polymer (A), the conductivity and thermal resistance of the solid electrolytic layer 13 are improved.

The alkaline metal hydroxide may be lithium hydroxide, sodium hydroxide, potassium hydroxide, rubidium hydroxide, cesium hydroxide, and the like. The alkaline earth metal hydroxide may be beryllium hydroxide, magnesium hydroxide, calcium hydroxide, strontium hydroxide, barium hydroxide, and the like.

For the conductive composition, these alkaline metal hydroxides and alkaline earth metal hydroxides may be used singly, or in combination of two or more types thereof.

The content of the alkaline metal hydroxide and/or alkaline earth metal hydroxide (E-1) may be 0.2 to 0.65 mol per 1 mol of a sulfonic acid group and/or a carboxyl group of the repeating unit (monomer unit) included in the conductive polymer (A). By being the content to be such a value, the thermal resistance and conductivity of the conductive composition become good. The content may be 0.3 to 0.6 mol.

<At Least One Compound (E-2) Selected from the Group Consisting of Acetate, Carbonate, Phosphate, and Halide of Alkaline Metal and/or Alkaline Earth Metal>

As an embodiment of the invention, at least one compound (E-2) selected from the group consisting of acetate, carbonate, phosphate, and halide of alkaline metal and/or alkaline earth metal may be included. For the conductive composition including the conductive polymer (A) and the compound (E-2), the conductivity degradation is inhibited after performing a heating treatment when forming the conductive composition. It is considered because the metal ion of the compound (E-1) inhibits the release of side chain of the conductive polymer (A) by heating.

In this case, in terms of conductivity and thermal resistance of the conductive polymer (A), the conductive polymer (A) purified by coming in contact with a cation-exchange resin may be used. By using the conductive polymer (A), the conductivity and thermal resistance of the solid electrolytic layer 13 are improved.

The compound (E-2) may be any one or two or more selected from acetates, carbonates, phosphates, and halides of alkaline metals, such as, lithium, sodium, potassium, rubidium, and cesium, and alkaline earth metals, such as, beryllium, magnesium, calcium, strontium, and barium.

In addition to those things, acetates, carbonates, phosphates, or halides with lithium, sodium, magnesium, or calcium may be used for the conductive composition. When these things are used as the compound (E-2), reactivity is high and economic feasibility is excellent.

Among the compounds, acetate, carbonate, and halides may be used for the conductive composition. These compounds are very suitable for handling.

Furthermore, in some cases, at least one type selected from the group consisting of acetate, carbonate, phosphate, and halides of alkaline metal and/or alkaline earth metal simply refers to alkaline metal salt and/or alkaline earth metal salt (E-2).

For the conductive composition, in addition to the acetate, carbonate, phosphate, or halides, the nitrides of alkaline metal and/or alkaline earth metal may be used.

In addition, the content of the compound (E-2) may be 0.01 to 2.0 mol, preferably 0.1 to 1.5 mol, and more preferably 0.2 to 1.0 mol with respect to 1 mol of the monomer repeating unit (monomer unit) of the conductive polymer (A) in terms of conductivity or thermal resistance.

<Compound (E-3) Including Alkaline Group and Hydroxyl Group in the Same Molecule>

As an embodiment of the invention, the conductive composition may include a compound (E-3) including an alkaline group and a hydroxyl group. For the conductive composition including the conductive polymer (A) and the compound (E-3) including an alkaline group and hydroxyl group in the same molecule, the conductivity degradation is inhibited after performing a heating treatment when forming the conductive composition.

For a reason, it is considered because the alkaline group included in the compound (E-3) inhibits the release of the side chain of the conductive polymer (A) by heating and/or the hydroxyl group included in the compound (E-3) acts as a doping agent for the conductive polymer (A), thereby improving conductivity.

In this case, in terms of conductivity and thermal resistance, the conductive polymer (A) purified by coming in contact with a cation-exchange resin may be used for the conductive polymer (A). By using the conductive polymer (A), the conductivity and thermal resistance of a solid electrolytic layer 13 are improved.

Here, the compound (E-3) has a chemical structure represented by the following General Formula (2).

[Chemical Formula 4]

In Formula (2), $A^1$ represents a hydroxyl group, $B^1$ represents an alkaline group, and $R^{54}$ represents an organic group.

The hydroxyl group may be in the state of being a hydroxyl group or in the state of being protected with a protecting group. Examples of the protecting group may include an silyl group, such as, an acetyl group, a trimethylsilyl group, or t-butyldimethylsilyl group, an acetal-type group (for example, a methoxymethyl group, an ethoxymethyl group, a methoxyethoxymethyl group, and the like), a benzoyl group, and the like. In addition, it may also include an alkoxide group.

Examples of the alkaline group may include the alkaline groups defined as an Arrhenius base, a Broensted base, a Lewis base, and the like.

Examples of the organic group may include aliphatic, alicyclic, aromatic, linear or branched saturated and/or unsaturated organic groups.

The compound (E-3) may be a compound (E-3') having an alkaline group and two or more hydroxyl group in the same molecule, in which the melting point thereof is also 30° C. or higher. By using the compound (E-3') as the compound (E-3), it is preferable in terms of thermal resistance.

Examples of the compound (E-3') may include 2-amino-1,3-propanediol, 3-amino-1,2-propanediol, tris(hydroxymethyl)aminomethane, 2-amino-2-methyl-1,3-propanediol, 2-amino-2-ethyl-1,3-propanediol, N,N-di(2-hydroxyethyl) glycine, 3-[N-tris(hydroxymethyl)methylamino]-2-hydroxypropanesulfonic acid, N-tris(hydroxymethyl)methyl-2-aminoethanesulfonic acid, 3-(3,4-dihydroxyphenyl)-L-alanine, N,N-bis(2-hydroxyethyl)-2-aminoethanesulfonic acid, N-tris(hydroxymethyl)methyl-3-aminopropanesulfonic acid, and the like.

As a part of the compounds, there are L- and D-geometric isomers, and as the compound (E-3) of the present embodiment, any one of L-form and D-form may be used, and also, the mixtures of L-form and D-form in various ratios may be used.

As a part of the compounds, there are the positional isomers of the substituents on o-position, m-position, and p-position, and as the compound (E-3) of the present embodiment, any one of the isomers of o-position, m-position, and p-position may be used, and the mixtures of these isomers in various ratios may be used.

The compound (E-3) of the present embodiment may be 2-amino-1,3-propanediol, tris(hydroxymethyl)aminomethane, 2-amino-2-methyl-1,3-propanediol, 2-amino-2-ethyl-1, 3-propanediol, 3-[N-tris(hydroxymethyl)methylamino]-2-hydroxypropanesulfonic acid, and N-tris(hydroxymethyl) methyl-2-aminoethanesulfonic acid. By using the compound (E-3), the conductivity and thermal resistance of a solid electrolytic layer 13 are improved. These compounds (E-3) may be used singly or in combination of two or more types thereof.

In addition, the content of the compound (E-3) may be 0.01 to 0.65 mol with respect to 1 mol of the repeating unit (monomer unit) having a sulfonic acid group and/or a carboxyl group of the conductive polymer (A). By using this content of the compound (E-3), the conductivity and thermal resistance of a solid electrolytic layer 13 are improved. The content of the compound (E-3) may be especially 0.05 to 0.45 mol.

The melting point of the compound (E-3') is preferably measured by a measuring method according to "Method for measuring melting point and dissolution range of chemicals" disclosed in Japanese Industrial Standards "JIS K 0064." In addition, the melting point is disclosed in "ACROS ORGANICS (2004, vol. 4)", "Aldrich (2005-2006, JAPAN)", "The MERCK INDEX (TWELFTH EDITION)," or "Basic Chemical Manual, Chemical Society of Japan (published by Maruzen)."

In addition, in the case where the compound has an alkaline group and two or more hydroxyl groups in the same molecule, and also, the melting point of 30° C. or higher, which is measured according to the above-described measuring method, even if the compound has the melting point of less than 30° C., which is measured according to a measuring method other than the above measuring methods, the compound is included in the compound (E-3') that constitutes the conductive composition of the embodiment of the invention.

<Compound (E-4) Including at Least One of Acidic Groups and at Least One of Alkaline Groups in the Same Molecule>

As an embodiment of the invention, the compound (E-4) including at least one of the acidic groups and at least one of the alkaline groups in the same molecule may be included. By adding the compound (E-4) to the conductive polymer (A), the conductivity degradation is inhibited after performing a heating treatment when forming a conductive composition.

For this reason, it is considered because the alkaline group included in the compound (E-4) inhibits the release of the side chain of the conductive polymer (A) by heating, and/or the acidic group included in the compound (E-4) acts as a doping agent for the conductive polymer (A), thereby improving conductivity.

In this case, in terms of conductivity and thermal resistance, the conductive polymer (A) purified by coming in contact with a cation-exchange resin may be used for the conductive polymer (A). By using the conductive polymer (A), the conductivity and thermal resistance of a solid electrolytic layer 13 are improved.

The compound (E-4) has a chemical structure represented by the following General Formula (3).

[Chemical Formula 5]

$$A^2\text{-}R^{55}\text{—}B^2 \quad (3)$$

In Formula (3), $A^2$ represents an acidic group, $B^2$ represents an alkaline group, and $R^{55}$ represents an organic group.

Examples of the acidic group may include an organic acid group, such as a carboxylic acid group and a sulfonic acid group, an inorganic acid group, such as, a phosphoric acid, a boric acid, and a chromic acid, and the like.

Examples of the alkaline group may include an Arrhenius base, a Broensted base, a Lewis base, and the like.

Examples of the organic group may include aliphatic, alicyclic, aromatic, linear or branched saturated and/or unsaturated organic groups.

Examples of the compound (E-4) including at least one of the acidic groups and at least one of the alkaline groups in the same molecule may include glycine, L-alanine, β-alanine, 4-aminobutanoic acid, 2-aminomethanesulfonic acid, 2-aminoethanesulfonic acid, 2-aminopropanesulfonic acid, sarcosine, 4-piperidinecarboxylic acid, proline, 2-benzimidazolepropionic acid, norvaline, serine, threonine, 2-(4-hydroxyphenyl)glycine, N,N-di(2-hydroxyethyl)glycine, tyrosine, 3-(3,4-dihydroxyphenyl)-alanine, isoserine, 4-amino-3-hydroxybutyric acid, homoserine, histidine, an aspartic acid, cysteine, a cysteic acid, lysine, arginine, an iminodiacetic acid, a glutamic acid, a 2-aminoadipic acid, a 2,6-diaminopimelic acid, guanidinoacetate, thiazolidine, a 2,4-dicarboxylic acid, or cystine.

In addition, as a part of the compounds (E-4), there are L- and D-stereoisomers or L- and D-enantiomers, and as the compound (E-4), any one of L-form and D-form may be used, and the mixtures of L-form and D-form in various ratios may be used.

The compound (E) may be 2-(4-hydroxyphenyl)glycine, isoserine, serine, a cysteic acid, an aspartic acid, a 2-aminoethanesulfonic acid, glycine, alanine, homoserine, and threonine. By using these things as the compound (E-4), the conductivity and thermal resistance of a solid electrolytic layer 13 are improved. The compound (E-4) may be 2-(4-hydroxyphenyl)glycine, isoserine, serine, a cysteic acid, an aspartic acid, a 2-aminoethanesulfonic acid, glycine, alanine, homoserine, or threonine. These compounds (E-4) may be used singly or in combination of two or more types thereof.

In addition, the content of the compound (E-4) may be 0.1 to 0.65 mol with respect to 1 mol of the repeating unit (monomer unit) having a sulfonic acid group and/or a carboxyl group of the conductive polymer (A). By using the content within the above-described range, the conductivity and thermal resistance of a solid electrolytic layer 13 become good. It may be more preferably 0.15 to 0.45 mol.

For a solid electrolytic capacitor 10 related to the present embodiment as described above, a solid electrolytic layer 13 is formed using a conductive composition including the conductive polymer (A), the compound (B) (the water-soluble polymer (C)), and optionally, a solvent (D) to be described below. Therefore, the conductive polymer is sufficiently impregnated into the inside of fine concave-convex of a dielectric oxidation film 12.

Therefore, since the solid electrolytic layer 13 is formed into the inside of the fine concave-convex of the dielectric oxidation film 12, capacity incidence is high, moisture resistance is good, and especially, the increase of an ESR (Equivalent Series Resistance) for a humidity resistance test under the atmosphere of 65° C. and 95% R.H is inhibited.

<Method for Manufacturing Solid Electrolytic Capacitor>

Next, an example of the method for manufacturing a solid electrolytic capacitor 10 related to the present embodiment will be descried.

A method for manufacturing a solid electrolytic capacitor 10 includes applying a conductive composition including the conductive polymer (A) and the compound (B) (the water-soluble polymer (C) and alkaline compound (E)) on a dielectric oxidation film 12 formed on the surface of a film-forming metal 11 (applying process), and drying the conductive composition applied to form a solid electrolytic layer 13 (drying process).

In the present embodiment, when the solid electrolytic capacitor 10 as illustrated in FIG. 1 is manufactured, the porous bodies are formed around the surface layer of a film-forming metal 11, such as, aluminum foil, by etching, a dielectric oxidation film 12 is formed by anodizing. Since then, after forming the solid electrolytic layer 13 on the dielectric oxidation film 12, the solid electrolytic layer 13 thus formed is dipped in a graphite solution or the graphite solution is applied on the solid electrolytic layer 13 to form a graphite layer 14 on the solid electrolytic layer 13, and then, a metal layer 15 is again formed on the graphite layer 14. It is sheathed with a cathode and anode (both of them are not illustrated) by connecting an external terminal (not illustrated) to form a solid electrolytic capacitor 10.

Here, a process of forming a solid electrolytic layer 13 will be described in detail.

The solid electrolytic layer 13 may be formed by applying a conductive composition solution including a conductive polymer that satisfies the above-described condition (i), and also, the compound (B) (the water-soluble polymer (C) and alkaline compound (E)) on the dielectric oxidation film 12 formed on the surface of the film-forming metal 11 to impregnate the conductive polymer into the inside of fine concave-convex of the dielectric oxidation film 12 (applying process), and then, drying the conductive composition solution thus applied (drying process).

Furthermore, in the embodiments of the invention, "the applying" refers to the formation of film (layer), and the coating and dipping are also included in the applying.

The conductive polymer solution may be obtained by dissolving a conductive polymer, and if necessary, additives, such as, other conductive polymers, dopant, or surfactant in a solvent.

In an embodiment of the invention, the content of the conductive polymer in the conductive polymer solution is adjusted to be 9% by mass or less in 100% by mass of the conductive polymer solution. When the content of the conductive polymer is 9% by mass or less, the wettability to the film-forming metal 11 having the dielectric oxidation film 12 or a separator 23 included in the winding-type solid electrolytic capacitor device 20 to will be described below is improved, and thus, the conductive polymer is not deposited on the surface of the dielectric oxidation film 12, and may be sufficiently impregnated into the inside of fine concave-convexes. The content thereof may be adjusted to be 5% by mass or less in 100% by mass of the conductive polymer solution.

The lower limit of the content of the conductive polymer is not particularly limited, but may be 0.1% by mass or more because the solid electrolytic layer 13 having a desired thickness may be easily formed. Therefore, the content of the conductive polymer may be preferably 0.1 to 9.0% by mass, and more preferably 0.1 to 5.0% by mass in 100% by mass of the conductive polymer solution.

A method of applying a conductive polymer solution on a dielectric oxidation film 12 may be a dip-coating method, a brush painting, a spin coating method, a casting method, a micro gravure coating method, a gravure coating method, a bar-coating method, a roll coating method, a wire-bar-coating method, a spray coating method, a flow-coating method, a screen printing method, a flexo printing method, an offset printing method, an ink jet printing method, and the like. Especially, in terms of an easy handling, a dip-coating method may be preferably used.

When a conductive polymer solution is applied according to a dip-coating method, a dipping time in the conductive polymer solution may be preferably 1 to 30 minutes in terms of workability.

In addition, at the time of performing the dip-coating, the dipping is performed under a reduced pressure, and then, the reduced pressure turns back to a normal pressure, or it is possible to use a method of pressuring at the time of performing the dipping.

However, for a spray coating method, it is possible to impregnate a conductive polymer into the inside of fine concave-convexes of a dielectric oxidation film 12 by physical force, but it is easy to blow the conductive polymer solution away on the parts other than the dielectric oxidation film 12, and thus, the conductive polymer availability is reduced. For the spray coating method, there is a high initial investment for a mechanism.

However, according to the embodiments of the invention, since the applying is performed using the conductive polymer solution, the handling is easy even though the spray coating method is not used, and also, the dip-coating method that can use the conductive polymer without waste may be used. Therefore, the invention is financially lucrative.

As a method of drying a conductive polymer solution after being applied, a heat-drying performed by a heating treatment may be preferably used, and for example, an air-drying method or a physical-drying method by spinning may be also preferably used.

In addition, a drying condition is determined according to a type of a conductive polymer or a solvent. However, generally, in terms of a drying property, the drying condition may be preferably 30 to 200° C., and a drying time may be preferably.

For manufacturing a solid electrolytic capacitor 10, the processes other than the process for forming a solid electrolytic layer 13 may be performed according to the known technologies.

<Method for Manufacturing Solid Electrolytic Capacitor Device>

Figure 2:
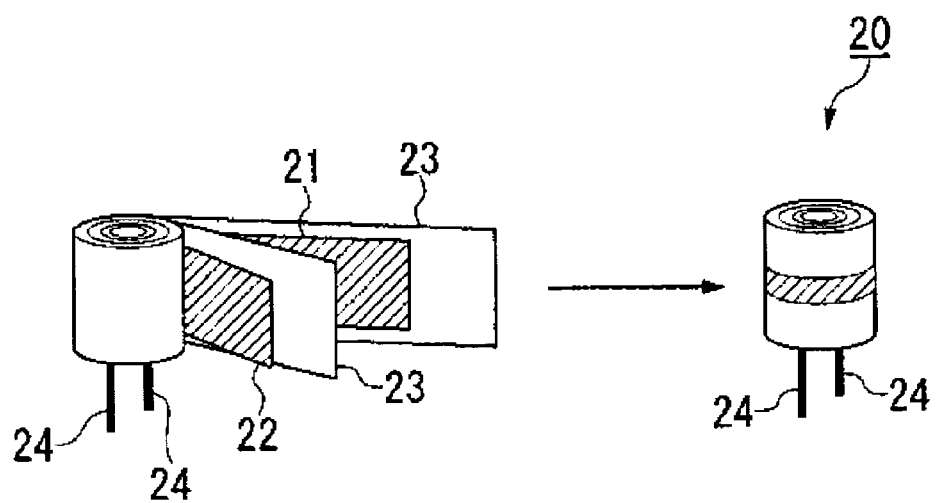
FIG. 2 is a perspective mimetic diagram illustrating another example of a solid electrolytic capacitor related to an embodiment of the invention.

A mean of manufacturing a solid electrolytic capacitor device 20 using the solid electrolytic capacitor 10 related to the present embodiment may be performed according to the known manufacturing method. For example, as illustrated in FIG. 2, it may be constituted by providing a separator 23 between an anode (anode body) 21 and a cathode (cathode body) 22 constituted of a graphite layer and a metal layer. The anode 21 may arbitrarily use an electrode that is conventionally known, and a conductive material as a constituent material. Examples of the conductive material may include aluminum, niobium, tantalum, titanium, magnesium, or other metals, and also, the alloy of these metals may be used. These metals constituting the anode 21 may be porous metals. The anode 21 has a dielectric oxidation film 12 on the surface of the constituent material.

When a solid electrolytic capacitor device 20 is manufactured, the laminate prepared by overlapping an anode 21, a cathode 22, and a separator 23 is wound and turned, and then, as described above, a solid electrolytic layer is formed on a dielectric oxidation film 12. The solid electrolytic layer may be formed by a method of applying a conductive polymer solution on the dielectric oxidation film 12 by a dip-coating method. Since then, an external terminal 24 may be connected to each of the anode 21 and cathode 22, and then, sheathed on each of them to be a winding-type solid electrolytic capacitor device 20. The solid electrolytic layer may be formed on the above-described laminate, and then, the solid electrolytic layer formed on the laminate may be wound and turned.

As a constituent material of the above-described separator, there may be a fiber, or a resin, such as PET. In addition, the separator may be prepared by permeating insulating oil in these constituent materials. The insulating oil may be electric insulating oil, such as, mineral oil, diallyl ethane oil, alkylbenzene oil, aliphatic ester oil (maleic acid ester, fumaric acid ester, and the like), aromatic ester oil (phthalate ester, and the like), polycyclic aromatic oil, or silicone oil, or the mixture thereof.

As a detailed example of manufacturing a solid electrolytic capacitor device 20, for example, the solid electrolytic capacitor device 20 may be manufactured by dipping a winding-type aluminum device (capacitor device) that is prepared by overlapping the conventional anode 21, cathode 22, and separator 23, and then, winding and turning overlapped them in the above-described conductive capacitor device for 1 to 15 minutes, for example, 5 minutes, and then, heat-drying the product thus obtained for 10 to 60 minutes (for example, 30 minutes) at 90 to 120° C. (for example, 105° C.).

<Type Having a Plurality of Conductive Polymer Layers>

As a changed embodiment of the invention, a plurality of solid electrolytic layers (at least two layers) may be included. For example, the solid electrolytic layer 13 may be included as a first conductive polymer layer (pre-coat), and a second conductive polymer layer may be formed on the first conductive polymer layer. By including the second conductive polymer layer, moisture resistance becomes good, and thus, high electric capacity incidence may be obtained. As the constituent material for the second conductive polymer, for example, PEDOT (polyethylenedioxy thiophene), and the like, may be arbitrarily used as long as it is a conductive polymer. When PEDOT is used as the constituent material, the conductivity and moisture resistance of the solid electrolytic layer 13 become good. Above this, as the constituent materials, the materials as described above as the materials for the first conductive polymer layer may be used.

As described above, for a method for manufacturing the solid electrolytic capacitor related to the embodiment of the invention, a solid electrolytic layer is formed by applying a conductive composition solution including the conductive polymer (A) and the compound (B) (the water-soluble polymer (C) and alkaline compound (E)) on a dielectric oxidation film formed on a film-forming metal, and thus, the conductive polymer may be sufficiently impregnated into the inside of fine concave-convexes of the dielectric oxidation film.

Therefore, it is possible to form a solid electrolytic layer having high conductivity on a dielectric oxidation film, and thus, it is possible to easily manufacture a solid electrolytic capacitor having high capacity incidence and good moisture resistance.

EXAMPLES

Hereinafter, the invention will be described in detail with reference to Examples and Comparative Examples, but the invention is not limited to Examples and Comparative Examples.

In addition, an evaluation method for Examples and Comparative Examples is as follows.

(Measurement of Volume Average Particle Diameter)

The volume average particle diameter of a conductive polymer was obtained as follows.

First, a conductive polymer solution having 1% by mass of conductive polymer concentration was prepared using ultrapure water as a solvent, and the particle distribution of the conductive polymer was measured by a dynamic light scattering method using a dynamic light scattering particle diameter-measuring device (manufactured by Nikkiso Co., Ltd., "NANOTRAC UPA-UT") and was calibrated with the viscosity of ultrapure water.

Here, when there were one or more obtainable peaks, the volume average particle diameter of the minimum particle distribution including the peak that has the minimum particle diameter was obtained, and then, was defined as the volume average particle diameter of the conductive polymer.

Furthermore, when the particle distribution measured by a dynamic light scattering method had one peak, after calibrating the particle distribution with the viscosity of ultrapure water, the volume average particle diameter of the conductive polymer was obtained using the particle distribution as it is as the minimum particle distribution.

(pH Measurement)

The pH of the compound (B) was obtained as follows.

First, the compound (B) solution was prepared using ultrapure water as a solvent to be 1 mol/L of the compound (B) concentration, and then, the pH thereof was measured using a pH-measuring device (manufactured by Horiba, Ltd. Corp., "LAQUA-F74").

<Preparation of conductive polymer (A)>

(A-1: preparation of poly(2-sulfo-5-methoxy-1,4-iminophenylene))

100 mmol of 2-aminoanisole-4-sulfonic acid was dissolved in water including 100 mmol of triethylamine at 25° C. while stirring, and then, the aqueous solution of 100 mmol of ammonium peroxodisulfate was dropped thereto. After completing the dropping, the reaction product thus obtained was further stirred at 25° C. for 12 hours, and then, the reaction product thus obtained was filtered and washed. Since then, the reaction product was dried to obtain 15 g of poly(2-sulfo-5-methoxy-1,4-iminophenylene) (A-1) in a phase of powder.

The volume average particle diameter of the obtained conductive polymer (A-1) was 0.95 nm and the volume resistance value thereof was 9.0 Ω·cm.

In addition, the mass average molecular weight of the conductive polymer (A-1) obtained by a sodium polystyrene sulfonate conversion by a gel permeation chromatography (GPC) was about 10000 Da.

<Preparations of Conductive Compositions 1 to 12>

The preparations of the conductive compositions 1 to 12 was adjusted as listed in Table 1.

In addition, for the compositions 1 to 8, 11, and 12, the conductive polymer (A-1) was dissolved in a solvent, but for the compositions 9 and 10, PEDOT (polyethylenedioxy thiophene) used as the conductive polymer (A-1) was not dissolved, and thus, was dispersed.

In addition, the volume average particle diameter of PEDOT was obtained using the same method as the conductive polymer (A-1), and thus, was 26.7 nm.

Example 1

(Manufacturing of Aluminum Device)

The anodizing was performed under the condition, such as, the voltage of 5.7 V and the temperature of 70° C. for 120 minutes in the aqueous adipic acid ammonium solution having 3% by mass of the concentration using an aluminum foil having an electric capacity of 95 μF/cm² per the unit area to form a dielectric oxidation film on the surface of the aluminum foil, and thus, to obtain an aluminum device.

(Measurement of Maximum Electric Capacity (Cw) of Aluminum Device)

The aluminum device was dipped in the aqueous adipic acid ammonium solution having 3% by mass of the concentration, and then, the submerged electric capacity (maximum electric capacity (Cw)) thereof was measured at 120 Hz using a LCR meter (manufactured by Agilent Technologies Japan, Ltd., "E4980A Precision LCR meter").

As a result, the maximum electric capacity (Cw) was 94 μF.

(Manufacturing of Laminated Aluminum Solid Electrolytic Capacitor)

The aluminum device was dipped in the conductive composition 1 for 5 minutes. Since then, the aluminum device was taken out, dried at 80° C. for 30 minutes, and then, heat-dried under the condition, such as, 200° C. for 10 minutes to form a solid electrolytic layer 13 on a dielectric oxidation film (the thickness thereof from the surface of the dielectric oxidation film was about 10 μm).

Since then, a graphite layer 14 and an aluminum electrode (a metal layer 15) were formed on the solid electrolytic layer 13, and then, a cathode lead terminal was connected to the aluminum electrode to manufacture a laminated aluminum solid electrolytic capacitor having the rated voltage of 6.3 V.

Here, the capacity incidence and moisture resistance of the aluminum solid electrolytic capacitor obtained to will be described below were evaluated.

Examples 2 to 6 and Comparative Examples 1 to 6

The laminated aluminum solid electrolytic capacitors were manufactured using the same method as Example 1, except that the compositions 2 to 12 were used instead of the conductive composition 1. For these examples, as will be described below, the capacity incidences and moisture resistances were evaluated.

(Evaluation 1: Moisture Resistance Evaluation)

The initial ESRs for the obtained laminated aluminum solid electrolytic capacitors were measured at 100 kHz using a LCR meter (manufactured by Agilent Technologies Japan, Ltd., "E4980A Precision LCR meter").

After measuring the initial ESRs, as the moisture resistance test, the laminated aluminum solid electrolytic capacitors were left under the atmosphere of 65° C. and 95% H for 500 hours without load.

Since then, after performing the test using the LCR meter, the ESRs were measured, and then, the rate of ESR change (times) (=(ESR after testing, 100 kHz)/(initial ESR, 100 kHz)) was calculated as moisture resistance. The results thus obtained are listed in Table 1.

(Evaluation 2: Measurement of Capacity Incidence)

The electric capacities (Cs) for the obtained laminated aluminum solid electrolytic capacitors were measured at 120 Hz using a LCR meter (manufactured by Agilent Technologies Japan, Ltd., "E4980A Precision LCR meter"). The capacity incidence of the laminated aluminum solid electrolytic capacitor was obtained from the following Equation (4). The results thus obtained are listed in Table 1. Here, Cw referred to the maximum electric capacity of an aluminum device, and was obtained by a measuring method according to the following Equation (4).

Capacity incidence (%)=(Cs/Cw)×100    (4)

(Evaluation 3: Evaluation of Homogeneity of Conductive Composition Layer)

The conductive composition including the conductive polymer (A), the compound (B), and the water-soluble polymer (C) was dropped in a glass Petri dish having φ 32 mm, heated at 80° C. for 30 minutes, and then, heat-dried under the condition of 200° C. for 10 minutes to form a conductive composition layer (the layer composed of a conductive composition) (the thickness of about 10 μm). The homogeneity (the state of cracking the layer) of the conductive composition layer was evaluated with the naked eye.

TABLE 2

| | | Evaluation 1: Moisture resistance test | | Evaluation 2: Device volume | |
|---|---|---|---|---|---|
| | Composition | ESR change after moisture resistance test (times) | Moisture resistance evaluation | Capacity incidence (%) | Capacity incidence evaluation |
| Example 1 | 1 | 1.7 | ○ | 79 | ○ |
| Example 2 | 2 | 1.6 | ○ | 87 | ⊚ |
| Example 3 | 3 | 1.2 | ⊚ | 84 | ⊚ |
| Example 4 | 4 | 1.5 | ○ | 92 | ⊚ |
| Example 5 | 5 | 1.1 | ⊚ | 91 | ⊚ |
| Example 6 | 6 | 1.8 | ○ | 80 | ○ |
| Comparative Example 1 | 7 | 3.4 | Δ | 59 | X |
| Comparative Example 2 | 8 | 1.2 | ⊚ | 61 | X |
| Comparative Example 3 | 9 | 5.7 | X | 85 | ⊚ |
| Comparative Example 4 | 10 | 5.3 | X | 84 | ⊚ |
| Comparative Example 5 | 11 | 3.1 | Δ | 82 | ⊚ |
| Comparative Example 6 | 12 | 3.3 | Δ | 79 | ○ |

The evaluation criteria in Table 2 is as follows.
(Evaluation 1: Moisture resistance evaluation)
⊚: The change of ESR after testing moisture resistance was less than 1.5 times as compared with the ESR before testing moisture resistance.
○: The change of ESR after testing moisture resistance was 1.5 times or more and less than 3.0 times as compared with the ESR before testing moisture resistance.
Δ: The change of ESR after testing moisture resistance was 3.0 times or more and less than 5.0 times as compared with the ESR before testing moisture resistance.
x: The change of ESR after testing moisture resistance was 5.0 times or more as compared with the ESR before testing moisture resistance.
(Evaluation 2: Capacity incidence evaluation)
⊚: The capacity incidence (%) was 80% or more.
○: The capacity incidence (%) was 70% or more and less than 80%.
x: The capacity incidence (%) was less than 70%.
(⊚: very good, ○: good, Δ: poor, x: very poor)

TABLE 1

| | Conductive polymer (A) | | | Compound (B) | | | Solvent (D): water |
|---|---|---|---|---|---|---|---|
| Composition | Types | Volume average particle diameter (nm) | Content (% by mass) | Name | pH (1 mol/L aq at 25° C.) | Content (% by mass) | Content (% by mass) |
| 1 | A-1 | 0.95 | 3.0 | Glycerin | 7.0 | 0.7 | 96.3 |
| 2 | A-1 | 0.95 | 3.0 | Trimethylolethane | 4.2 | 0.5 | 96.5 |
| 3 | A-1 | 0.95 | 3.0 | Trimethylolethane | 4.2 | 0.9 | 96.1 |
| 4 | A-1 | 0.95 | 3.0 | Pentaerythritol | 6.5 | 0.6 | 96.4 |
| 5 | A-1 | 0.95 | 3.0 | Pentaerythritol | 6.5 | 1.0 | 96.0 |
| 6 | A-1 | 0.95 | 3.0 | Mannitol | 4.8 | 0.8 | 96.2 |
| 7 | PEDOT | 26.7 | 1.2 | — | — | — | — |
| 8 | PEDOT | 26.7 | 1.2 | Pentaerythritol | 6.5 | 0.3 | 98.5 |
| 9 | A-1 | 0.95 | 3.0 | — | — | — | — |
| 10 | A-1 | 0.95 | 3.0 | Ethylene glycol | 7.1 | 0.5 | 96.5 |
| 11 | A-1 | 0.95 | 3.0 | Tris(hydroxymethyl)aminomethane | 11.0 | 0.5 | 96.5 |
| 12 | A-1 | 0.95 | 3.0 | Triethanolamine | 10.9 | 0.7 | 96.3 |

As could be clearly seen from Table 2, for Examples 1 to 6 using the conductive composition including the conductive polymer (A) and the compound (B), as could be seen from the test results, the solid electrolytic capacitor having high capacity incidence and also inhibited ESR increase after testing moisture resistance could be obtained.

Meanwhile, in the case of Comparative Examples 1 and 2 using the composition including the conductive polymer having large particle diameter in a dispersed solution, it was difficult to impregnate the conductive polymer into the inside of fine concave-convexes of the dielectric oxidation film, and thus, the capacity incidence thereof was low.

In the case of Comparative Examples 3 to 6 using the conductive composition without the compound (B), the moisture resistance was decreased, and thus, the significant increased ESR after testing moisture resistance could be seen.

In addition, for Comparative Examples 5 and 6 including the compound having three hydroxyl groups, but also, high pH, as compared with Example, the moisture resistance was reduced.

Examples 7 to 10

<Adjustments of Conductive Compositions 13 to 16>

As listed in Table 3, the conductive compositions 13 to 16 were prepared. The conductive compositions 13 to 16 were dropped in a glass Petri dish having ϕ 32 mm, heated at 80° C. for 30 minutes, and then, heat-dried under the condition of 200° C. for 10 minutes to form the conductive compositions (the layer composed of the conductive composition) (the thickness of about 10 μm). Since then, the homogeneities of the conductive composition layers were evaluated with the naked eye. As the results thus obtained are listed in Table 4.

The evaluation criteria in Table 4 is as follows.

⊚: The change of ESR after testing moisture resistance was less than 1.5 times as compared with the ESR before testing moisture resistance.

○: The change of ESR after testing moisture resistance was 1.5 times or more and less than 3.0 times as compared with the ESR before testing moisture resistance.

Δ: The change of ESR after testing moisture resistance was 3.0 times or more and less than 5.0 times as compared with the ESR before testing moisture resistance.

x: The change of ESR after testing moisture resistance was 5.0 times or more as compared with the ESR before testing moisture resistance.

(Evaluation 2: Capacity Incidence Evaluation)

⊚: The capacity incidence (%) was 80% or more.

○: The capacity incidence (%) was 70% or more and less than 80%.

x: The capacity incidence (%) was less than 70%.

(Evaluation 3: Homogeneity Evaluation)

○: There were no cracks on the surface of the conductive composition layer after heat-drying.

x: There were cracks on the surface of the conductive composition layer after heat-drying.

(⊚: very good, ○: good, Δpoor, x: very poor)

As could be clearly seen from Table 4, for Examples 7 to 10 using the conductive composition including the conductive polymer (A), the compound (B), and the water-soluble polymer (C), it was possible to form the homogenous conductive composition layer. According to this result, it could be possible to form the conductive composition layer having excellent moisture resistance, capacity incidence, and homogeneity.

Examples 11 to 15 and Comparative Examples 7 and 8

Examples 11 to 15 and Comparative Examples 7 and 8 were prepared using the same method as Example 1, except that the conductive polymer (A), the compound (B), the water-soluble polymer (C), and the solvent (E) were adjusted as listed in Table 5, respectively. In addition, the compositions for Examples 1 to 10 and Comparative Examples 1 to 6 along with a solvent (D) (all using water) are also listed in Tables 5 and 7. For Examples 13 to 15 and Comparative Examples 7 and 8, in which a pre-coat (a coating operation as a pre-treatment) was performed on a first layer (first conductive polymer layer), and then, PEDOT

TABLE 3

| Composition | Conductive polymer (A) | | Compound (B) | | Water-soluble polymer (C) | | Solvent (D): water |
|---|---|---|---|---|---|---|---|
| | Types | Content (% by mass) | Names | Content (% by mass) | Names | Content (% by mass) | Content (% by mass) |
| 13 | A-1 | 30 | Glycerin | 0.7 | Polyvinyl alcohol | 3.0 | 93.3 |
| 14 | A-1 | 30 | Pentaerythritol | 1.0 | Polyvinyl alcohol | 1.5 | 94.5 |
| 15 | A-1 | 30 | Pentaerythritol | 1.0 | Methylcellulose | 1.5 | 94.5 |
| 16 | A-1 | 30 | Pentaerythritol | 1.0 | Pullulan | 1.5 | 94.5 |

TABLE 4

| | Composition | Evaluation 1 | | Evaluation 2 | | Evaluation 3 |
|---|---|---|---|---|---|---|
| | | ESR change after moisture resistance test (times) | Moisture resistance test | Capacity incidence (%) | Capacity incidence evaluation | Homogeneity evaluation |
| Example 7 | 13 | 1.3 | ⊙ | 79 | ○ | ○ |
| Example 8 | 14 | 1.1 | ⊙ | 81 | ⊙ | ○ |
| Example 9 | 15 | 1.2 | ⊙ | 81 | ⊙ | ○ |
| Example 10 | 16 | 1.8 | ○ | 79 | ○ | ○ | was used as a second layer (second conductive polymer layer), the compositions used for the first layer and second layer are listed in Table 6, respectively.

The results of evaluating Examples and Comparative Examples according to the criteria of the above-described evaluation 1 and evaluation 2 are listed in Table 7.

TABLE 5

| | | | Conductive polymer (A) | | Compound (B) | | |
|---|---|---|---|---|---|---|---|
| Application | | Composition | Types | Volume average particle diameter (nm) | Content (wt %) | Names | pH (1 mol/L aq. @ 25° C.) | Content (wt %) |
| Main electrolyte | Example 1 | 1 | A-1 | 0.95 | 3 | G | 7 | 0.7 |
| | Example 2 | 2 | A-1 | 0.95 | 3 | TME | 4.2 | 0.5 |
| | Example 3 | 3 | A-1 | 0.95 | 3 | TME | 4.2 | 0.9 |
| | Example 4 | 4 | A-1 | 0.95 | 3 | PE | 6.5 | 0.6 |
| | Example 5 | 5 | A-1 | 0.95 | 3 | PE | 6.5 | 1 |
| | Example 6 | 6 | A-1 | 0.95 | 3 | M | 4.8 | 0.8 |
| | Comparative Example 1 | 7 | PEDOT | 26.7 | 1.2 | — | — | — |
| | Comparative Example 2 | 8 | PEDOT | 26.7 | 1.2 | PE | 6.5 | 0.3 |
| | Comparative Example 3 | 9 | A-1 | 0.95 | 3 | — | — | — |
| | Comparative Example 4 | 10 | A-1 | 0.95 | 3 | EG | 7.1 | 0.5 |
| | Comparative Example 5 | 11 | A-1 | 0.95 | 3 | TRIS | 11 | 0.5 |
| | Comparative Example 6 | 12 | A-1 | 0.95 | 3 | TE | 10.9 | 0.7 |
| | Example 7 | 13 | A-1 | 0.95 | 3 | G | 7 | 0.7 |
| | Example 8 | 14 | A-1 | 0.95 | 3 | PE | 6.5 | 1 |
| | Example 9 | 15 | A-1 | 0.95 | 3 | PE | 6.5 | 1 |
| | Example 10 | 16 | A-1 | 0.95 | 3 | PE | 6.5 | 1 |
| | Example 11 | 17 | A-1 | 0.95 | 3 | — | — | — |
| | Example 12 | 18 | A-1 | 0.95 | 3 | — | — | — |
| Precoat Second layer PEDOT | Example 13 | 19 | A-1 | 0.95 | 3 | PE | 6.5 | 1 |
| | Example 14 | 20 | A-1 | 0.95 | 3 | — | — | — |
| | Example 15 | 21 | A-1 | 0.95 | 3 | — | — | — |
| | Comparative Example 7 | 9 | A-1 | 0.95 | 3 | — | — | — |
| | Comparative Example 8 | 7 | PEDOT | 26.7 | 1.2 | — | — | — |

| | | Compound (B) | | | Water-soluble polymer (C) | | | Solvent (D) |
|---|---|---|---|---|---|---|---|---|
| Application | | Names | pH (1 mol/L aq. @ 25° C.) | Content (wt %) | Names | Degree of acetalization mol % | Content | (water) Content (wt %) |
| Main electrolyte | Example 1 | — | — | — | — | — | — | 96.3 |
| | Example 2 | — | — | — | — | — | — | 96.5 |
| | Example 3 | — | — | — | — | — | — | 96.1 |
| | Example 4 | — | — | — | — | — | — | 96.4 |
| | Example 5 | — | — | — | — | — | — | 96 |
| | Example 6 | — | — | — | — | — | — | 96.2 |
| | Comparative Example 1 | — | — | — | — | — | — | — |
| | Comparative Example 2 | — | — | — | — | — | — | 98.5 |
| | Comparative Example 3 | — | — | — | — | — | — | 97 |
| | Comparative Example 4 | — | — | — | — | — | — | 96.5 |
| | Comparative Example 5 | — | — | — | — | — | — | 96.5 |
| | Comparative Example 6 | — | — | — | — | — | — | 96.3 |
| | Example 7 | PVA | 6.8 | 3 | — | — | — | 93.3 |
| | Example 8 | PVA | 6.8 | 1.5 | — | — | — | 94.5 |
| | Example 9 | MS | 7 | 1.5 | — | — | — | 94.5 |
| | Example 10 | P | 7 | 1.5 | — | — | — | 94.5 |
| | Example 11 | — | — | 1.5 | PVB | 8 | 1.5 | 95.5 |
| | Example 12 | — | — | — | PVB | 30 | 1.5 | 95.5 |

TABLE 5-continued

| | | | | | | | | |
|---|---|---|---|---|---|---|---|---|
| Precoat | Example 13 | — | — | — | — | — | — | 94.5 |
| Second layer | Example 14 | PVA | 6.8 | 1 | — | — | — | 94.5 |
| PEDOT | Example 15 | — | — | — | PVB | 8 | 1 | 94.5 |
| | Comparative Example 7 | — | — | — | — | — | — | 97 |
| | Comparative Example 8 | — | — | — | — | — | — | — |

Compound names in Table: G=glycerin, TME=trimethylolethane, PE=pentaerythritol, M=mannitol, EG=ethylene glycol, TRIS=tris(hydroxymethyl)aminomethane, TE=triethanolamine, PVA=polyvinyl alcohol, MS=methylcellulose, P=pullulan, and PVB=polyvinyl butyral

TABLE 6

| | First layer (precoat) | | | | Second layer |
|---|---|---|---|---|---|
| | Conductive polymer | Pentaerythritol | PVA | PVB | |
| Example 13 | A-1 3% | 1 | | | PEDOT |
| Example 14 | A-1 3% | | 1 | | PEDOT |
| Example 15 | A-1 3% | | | 1 | PEDOT |
| Comparative Example 8 | A-1 3% | | | | PEDOT |
| Comparative Example 9 | PEDOT 1.2% | | | | PEDOT |

TABLE 7

| | Evaluation 1 Moisture resistance test | | Evaluation 2 Electric capacity | | Evaluation 3 Durability |
|---|---|---|---|---|---|
| | ESR change after moisture resistance (Times) | Moisture resistance test | Capacity incidence (%) | Capacity incidence evaluation | Durability evaluation |
| Example 1 | 1.7 | ○ | 79 | ○ | Δ |
| Example 2 | 1.6 | ○ | 87 | ◎ | Δ |
| Example 3 | 1.2 | ◎ | 84 | ◎ | Δ |
| Example 4 | 1.5 | ○ | 92 | ◎ | ○ |
| Example 5 | 1.1 | ◎ | 91 | ◎ | ○ |
| Example 6 | 1.8 | ○ | 80 | ◎ | ○ |
| Comparative Example 1 | 3.4 | Δ | 59 | X | Δ |
| Comparative Example 2 | 1.2 | ◎ | 60 | X | Δ |
| Comparative Example 3 | 5.7 | X | 85 | ◎ | X |
| Comparative Example 4 | 5.3 | X | 84 | ◎ | X |
| Comparative Example 5 | 3.1 | Δ | 82 | ◎ | X |
| Comparative Example 6 | 3.3 | Δ | 79 | ○ | X |
| Example 7 | 1.3 | ◎ | 79 | ○ | ○ |
| Example 8 | 1.1 | ◎ | 81 | ◎ | ○ |
| Example 9 | 1.2 | ◎ | 81 | ◎ | ○ |
| Example 10 | 1.8 | ○ | 79 | ○ | ○ |
| Example 11 | 1.2 | ◎ | 83 | ◎ | ○ |
| Example 12 | 1.5 | ○ | 79 | ○ | ○ |
| Example 13 | 1.6 | ○ | 89 | ◎ | — |
| Example 14 | 1.8 | ○ | 79 | ○ | — |
| Example 15 | 1.5 | ○ | 78 | ○ | — |
| Comparative Example 7 | 6.3 | X | 78 | ○ | — |
| Comparative Example 8 | 3.6 | Δ | 58 | X | — |

Examples 13 to 15 and Comparative Example 7 using the compound polymer (A-1) as the compound (A) exhibit excellent results for capacity incidence as compared with Comparative Example 8 using PEDOT. Comparative Example 7 without using the compounds (B) and (C) exhibits poor results for a moisture resistance test as compared with them. Examples 13 to 15 using any one of pentaerythritol or polyvinyl alcohol as the compound (B) and polyvinyl butyral as the compound (C) exhibit excellent results for both of the moisture resistance and capacity incidence, but Example 13 using pentaerythritol as the compound (B) exhibits most excellent result for the capacity incidence. From these results, it could be confirmed that the solid electrolytic capacitor having a plurality of conductive polymer layers exhibits good moisture resistance and capacity incidence.

INDUSTRIAL APPLICABILITY

According to the invention, provided are a conductive composition for a capacitor, in which a conductive polymer can be sufficiently impregnated into the inside of an anode body (a film-forming metal) having a dielectric oxidation film, and also, a solid electrolytic capacitor having high moisture resistance and high reliability can be easily manufactured, and a solid electrolytic capacitor that can be obtained using the above-described composition.

EXPLANATIONS OF LETTERS OR NUMERALS

10: Solid electrolytic capacitor
11: Film-forming metal
12: Dielectric oxidation film
13: Solid electrolytic layer
14: Graphite layer
15: Metal layer
20: Solid electrolytic capacitor device
21: Anode
22: Cathode

The invention claimed is:

1. A conductive composition, comprising:
   a conductive polymer (A) that satisfies condition (i); and
   a water-soluble polymer (C) comprising a repeating unit having an acetal group, in which the repeating unit constitutes a polymer,
   condition (i): when a particle distribution for a conductive polymer solution including 1% by mass of the conductive polymer (A) with respect to the total mass of the solution is measured by a dynamic light scattering method, and then, a minimum particle distribution including the peak exhibiting a minimum particle diameter among one or more peaks that can be obtained by the above measurement is obtained, a volume average particle diameter of the particle diameter included in the minimum particle distribution is 5 nm or less.

2. The conductive composition according to claim 1, wherein the volume average particle diameter of the conductive polymer (A) for the condition (i) is 0.1 to 5 nm.

3. The conductive composition according to claim 1, wherein the repeating units that constitute the conductive polymer (A) have an acidic group.

4. The conductive composition according to claim 1, wherein the acidic group is a sulfonic acid group or a carboxylic acid group.

5. The conductive composition according to claim 1, wherein the conductive polymer (A) has a repeating unit of formula (1):

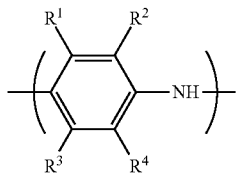

(1)

wherein $R^1$ to $R^4$ are each independently —H, a linear or branched alkyl group of 1 to 24 carbon atoms, a linear or branched alkoxy group having 1 to 24 carbon atoms, an acidic group or a salt thereof, a hydroxyl group, a nitro group, —F, —Cl, —Br, or —I, and among $R^1$ to $R^4$, at least one represents an acidic group or a salt thereof, where the acidic group is a sulfonic acid or a carboxyl group.

6. The conductive composition according to claim 1, wherein a repeating unit that constitutes the water-soluble polymer (C) having an acetal group has a polyvinyl alcohol derivative.

7. The conductive composition according to claim 1, wherein the water-soluble polymer (C) having an acetal group has a degree of acetalization of 5 to 50 mol %.

8. A solid electrolytic capacitor comprising a solid electrolyte including the conductive composition of claim 1.

9. The conductive composition according to claim 1, wherein the volume average particle diameter of the conductive polymer (A) for the condition (i) is 0.01 to less than 5 nm.

10. The conductive composition according to claim 1, wherein the volume average particle diameter of the conductive polymer (A) for the condition (i) is 0.01 to 0.95 nm.

11. The conductive composition according to claim 1, wherein the content of the conductive polymer (A) in the conductive composition is 0.1 to 9% by mass and the content of the water-soluble polymer (C) in the conductive composition is 1 to 50% by mass.

12. The conductive composition according to claim 9, wherein the content of the conductive polymer (A) in the conductive composition is 0.1 to 9% by mass and the content of the water-soluble polymer (C) in the conductive composition is 1 to 50% by mass.

* * * * *